United States Patent
Fukuda

(10) Patent No.: US 7,891,922 B2
(45) Date of Patent: Feb. 22, 2011

(54) VIBRATION ISOLATOR FOR CONTAINER AND THE LIKE, AND METHOD OF USING THE SAME

(75) Inventor: Akio Fukuda, Kanagawa (JP)

(73) Assignee: Mugen Corporation, Kanagawa (JP)

(*) Notice: Subject to any disclaimer, the term of this patent is extended or adjusted under 35 U.S.C. 154(b) by 649 days.

(21) Appl. No.: 11/919,244

(22) PCT Filed: Mar. 10, 2006

(86) PCT No.: PCT/JP2006/304748
§ 371 (c)(1),
(2), (4) Date: Oct. 25, 2007

(87) PCT Pub. No.: WO2006/114945
PCT Pub. Date: Nov. 2, 2006

(65) Prior Publication Data
US 2009/0279998 A1    Nov. 12, 2009

(30) Foreign Application Priority Data
Apr. 25, 2005 (JP) .............................. 2005-126349

(51) Int. Cl.
*B60P 7/08* (2006.01)
(52) U.S. Cl. .............................. 410/86; 410/46; 410/82; 410/87

(58) Field of Classification Search .................. 410/46, 410/82, 86, 87, 88; 280/406.1; 267/103, 267/217
See application file for complete search history.

(56) References Cited

U.S. PATENT DOCUMENTS
6,059,497 A * 5/2000 Iannone ....................... 410/87

FOREIGN PATENT DOCUMENTS
| JP | 59-63039 | 4/1984 |
| JP | 61-59450 | 4/1986 |
| JP | 62-251380 | 11/1987 |
| JP | 07-097066 | 4/1995 |
| JP | 2000-142212 | 5/2000 |

* cited by examiner

*Primary Examiner*—Stephen Gordon
(74) *Attorney, Agent, or Firm*—Kubotera & Associates LLC

(57) ABSTRACT

A vibration isolator for container, and the like, and a method of using the same which are applicable to general containers, and allow the loaded articles to be protected against vibration at the time of transportation, and the like, with the cost being held to a minimum. It is a vibration isolator (10) for container (C), and the like, which provides vibration isolation for cargo protection, being interposed beneath a transport container (C), a merchandise transport pallet, or the like, wherein shock absorbing members (50) are interposed between a base frame (20) and a load carrying frame (30); and at least at the four corners of the base frame (20), a latch receiving structure (25) of a twist lock (40) is disposed, and in the corresponding place in the load carrying frame (30), a twist lock (40) is disposed.

8 Claims, 4 Drawing Sheets

VIBRATION ISOLATOR FOR CONTAINER AND THE LIKE, AND METHOD OF USING THE SAME

TECHNICAL FIELD

The present invention relates to a vibration isolator for container, and the like, that provides vibration isolation for cargo protection, being interposed beneath a transport container, a merchandise transport pallet, or the like. The present invention also relates to a method of using the same.

BACKGROUND ART

Examples of the prior art include the art as disclosed in Japanese Patent Laid-Open Publication No. 2000-142212. Specifically, Japanese Patent Laid-Open Publication No. 2000-142212 discloses a container in which a container main body is disposed within an enclosure box, and between this enclosure box and the container main body, a shock absorbing structure is provided.

DISCLOSURE OF THE INVENTION

However, with such a prior art, the container is specialized, being required to be handled differently from the container which is generally used, thus presenting a difficulty in use and handling, and a problem that it is expensive, being a specialized item.

The present invention has been made in view of such problems with which the prior art has encountered, and the purpose of the present invention is to provide a vibration isolator for container, and the like, and a method of using the same which are applicable to general containers, and allow the loaded articles to be protected against vibration at the time of transportation, and the like, with the cost being held to a minimum.

In order to achieve the above objects, according to a first aspect of the present invention, a vibration isolator for container and merchandise transport pallet that provides vibration isolation for cargo protection, being interposed beneath a transport container or a merchandise transport pallet wherein shock absorbing members based on a plurality of pneumatic springs are interposed between a base frame which is loaded on a load carrying vehicle and a load carrying frame on which a container or a merchandise transport pallet is loaded;

said load carrying frame is made up of steel members connected in the form of a lattice, and at least at the four corners thereof, a twist lock is disposed which, by turning a latch fitted into a latch receiving structure provided for the container or the merchandise transport pallet, is engaged such that the twist lock will not come off;

said base frame is made up of steel members connected in the form of a lattice, and in the corresponding place therein, a latch receiving structure with which a latch of a twist lock of the load carrying vehicle is engaged is disposed; and said load carrying frame and base frame are combined to provide an assembly which is capable of being mounted to either the bottom face of a container or a merchandise transport pallet, or the top face of a load carrying vehicle.

According to a second aspect of the present invention, a vibration isolator for container, and the like, that provides vibration isolation for cargo protection, being interposed beneath a transport container, a merchandise transport pallet, or the like, wherein shock absorbing members are interposed between a base frame and a load carrying frame; and at least at the four corners of the base frame, a latch receiving structure of a twist lock is disposed, and also in the corresponding place in the load carrying frame, a latch receiving structure of a twist lock is disposed.

According to a third aspect of the present invention, a vibration isolator for container, and the like, that provides vibration isolation for cargo protection, being interposed beneath a transport container, a merchandise transport pallet, or the like, wherein shock absorbing members based on a plurality of pneumatic springs are interposed between a base frame and a load carrying frame; and at least at the four corners of the base frame, a latch receiving structure with which a latch of a twist lock in a load carrying vehicle is engaged is disposed, and in the corresponding place in the load carrying frame, a twist lock which latch is engaged with a latch receiving structure provided for a container, or the like, is disposed.

According to a fourth aspect of the present invention, a vibration isolator for container and merchandise transport pallet that provides vibration isolation for cargo protection, being interposed beneath a transport container or a merchandise transport pallet wherein shock absorbing members based on a plurality of pneumatic springs are interposed between a base frame which is loaded on a load carrying vehicle and a load carrying frame on which a container or a merchandise transport pallet is loaded;

said load carrying frame is made up of steel members connected in the form of a lattice, and at least at the four corners thereof, a twist lock is disposed which, by turning a latch fitted into a latch receiving structure provided for the container or the merchandise transport pallet, is engaged such that the twist lock will not come off; and said base frame is made up of steel members connected in the form of a lattice, and in the corresponding place therein, a latch receiving structure with which a latch of a twist lock of the load carrying vehicle is engaged is disposed;

an air chuck which connects to a compressed air pipe from a load carrying vehicle, and an air reservoir which accumulates compressed air introduced through the air chuck for supplying it to the pneumatic springs are provided; and said load carrying frame and base frame are combined to provide an assembly which is capable of being mounted to either the bottom face of a container or a merchandise transport pallet, or the top face of a load carrying vehicle.

According to a fifth aspect of the present invention, a vibration isolator for container and merchandise transport pallet that provides vibration isolation for cargo protection, being interposed beneath a transport container or a merchandise transport pallet wherein shock absorbing members based on a plurality of pneumatic springs are interposed between a base frame which is loaded on a load carrying vehicle and a load carrying frame on which a container or a merchandise transport pallet is loaded;

said load carrying frame is made up of steel members connected in the form of a lattice, and at least at the four corners thereof, a twist lock is disposed which, by turning a latch fitted into a latch receiving structure provided for the container or the merchandise transport pallet, is engaged such that the twist lock will not come off; and said base frame is made up of steel members connected in the form of a lattice, and also in the corresponding place therein, a twist lock is disposed.

According to a sixth aspect of the present invention, the vibration isolator according to the first or the second aspect, wherein, as the shock absorbing member, a shock absorber or any other hydraulic apparatus is used.

According to a seventh aspect of the present invention, a method of using a vibration isolator, wherein loading/unloading or transport is carried out with the vibration isolator of any one of the first aspect to the sixth aspect being kept mounted to the bottom face of a container, or the like.

According to a eighth aspect of the present invention, a method of using a vibration isolator, wherein loading/unloading or transport is carried out with the vibration isolator of any one of the first aspect to the sixth aspect being kept mounted to a load carrying vehicle.

The present invention will function as follows: The vibration isolator provides vibration isolation for cargo protection, being interposed beneath a transport container, a merchandise transport pallet, or the like, which is transported, being loaded on a load carrying vehicle, such as a trailer, a vessel, a freight train, a cargo truck, or the like.

Generally, the vibration isolator is first mounted on a load carrying vehicle with the base frame being placed downward. The load carrying vehicle is equipped with twist locks having a latch, and the vibration isolator is mounted such that the latches of the twist locks of the load carrying vehicle are fitted into the latch receiving structures of the base frame, respectively. As is generally known, turning the latch will fix the twist lock such that it will not come off from the latch receiving structure.

The container, or the like, is placed on the load carrying frame of the vibration isolator before being packed. The container, or the like, is equipped with latch receiving structures, and the container, or the like, is loaded such that the latches of the twist locks of the load carrying frame are fitted into the latch receiving structures of the container, or the like. By turning the latches of the twist locks in the load carrying frame of the vibration isolator, the latches can be prevented from being disconnected from the latch receiving structures, resulting in the container or the like, being firmly secured.

When the load carrying vehicle loaded with the container, or the like, is vibrated, the base frame of the vibration isolator is vibrated together. On the other hand, the load carrying frame of the vibration isolator is vibrated with the vibration being damped, because shock absorbing members are interposed between the base frame and the load carrying frame for absorbing the vibration. Thereby, no strong vibration will be transmitted directly to the articles loaded in the container, or the like, thus the vibration isolator having the shock absorbing members can provide protection.

In case that the shock absorbing members interposed between the base frame and the load carrying frame provide a plurality of pneumatic springs, the air therein serves as a cushion to sufficiently buffer the vibration. In addition, by adjusting the air pressure within the pneumatic springs, an appropriate shock absorbing action suited for the loaded articles is provided, which allows the function of the vibration isolator to be sufficiently exerted.

With some trailers, and the like, as load carrying vehicles, the compressed air created by means of the engine is utilized for controlling the brake. Likewise, with the vibration isolator, the compressed air pipe is connected to the air chuck to supply compressed air to the pneumatic springs as the shock absorbing members. The compressed air introduced through the air chuck is accumulated in the air reservoirs, and from the air reservoirs, the compressed air is supplied to the respective pneumatic springs. Thereby, the air pressure in the pneumatic springs, which are the shock absorbing members, can be maintained at an appropriate value or properly adjusted.

Depending upon the specifications, the latch receiving structure of the twist lock may be disposed both in the base frame and the load carrying frame, and in such a case, twist locks are provided for the load carrying vehicle and the container, or the like, and the latches thereof are received by the latch receiving structures for firmly securing the container, or the like.

Contrarily to this, depending upon the specifications, the twist lock may be disposed both in the base frame and the load carrying frame, and in such a case, the latch receiving structures are provided for the load carrying vehicle and the container, or the like, the latches being fitted thereinto for firmly securing the container, or the like.

As the shock absorbing member, a shock absorber, and other hydraulic apparatuses can be used to buffer the vibration.

The vibration isolator can be kept mounted to the bottom face of the container, or the like, for carrying out loading/unloading, or transport. In case that the container, or the like, is moved, being firmly secured to the load carrying vehicle, the shock absorbing members buffer the vibration during movement in the same way as described above. In addition, in case that the container, or the like, is to be reloaded by lifting it or bringing it up, and then lowering it with the vibration isolator being kept mounted, the base frame of the vibration isolator is first contacted with the ground or floor, the shock absorbing members absorbing the impact.

Because the vibration isolator can be handled integrally with the container, or the like, being kept mounted thereon, the loaded articles, and the like, can be protected, while smooth loading/unloading being carried out.

In addition, also with the vibration isolator being kept mounted on the load carrying vehicle, loading/unloading, and transport can be carried out. When the container, or the like, is loaded on the vibration isolator, the loaded articles, and the like, can be protected, the vibration during movement being buffered in the same way as described above. And, when the container, or the like, is loaded on the vibration isolator which is mounted on the load carrying vehicle, the shock absorbing members absorb the impact which is applied when the bottom face of the container, or the like, is butted against the load carrying frame of the vibration isolator, thus protecting the loaded articles, and the like.

If the vibration isolator is mounted on the load carrying vehicle, there is no need for taking any measure for vibration isolation on the side of the container, or the like, and the articles, and the like, loaded in the container, or the like, can be protected, while loading/unloading being smoothly carried out.

BEST MODE FOR CARRYING OUT THE INVENTION

Figure 1:
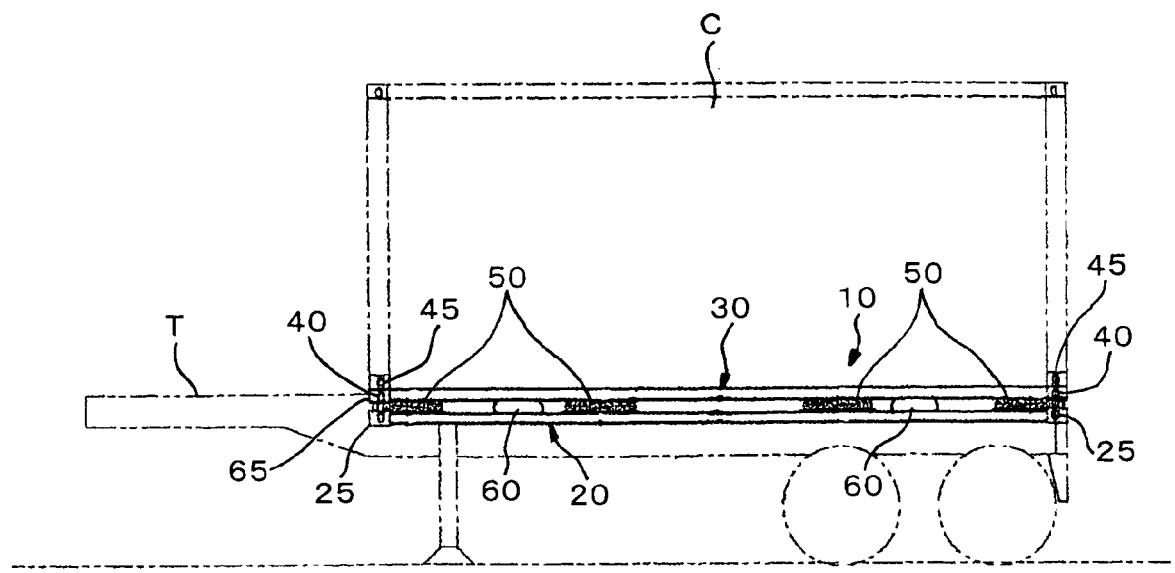
FIG. 1 is a side view illustrating a vibration isolator pertaining to one embodiment of the present invention.
Figure 2:
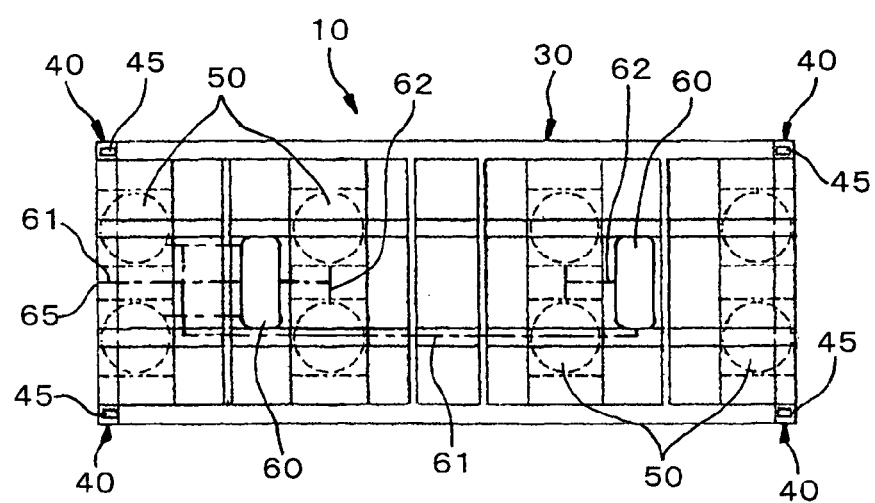
FIG. 2 is a plan view illustrating a vibration isolator pertaining to one embodiment of the present invention.
Figure 3:
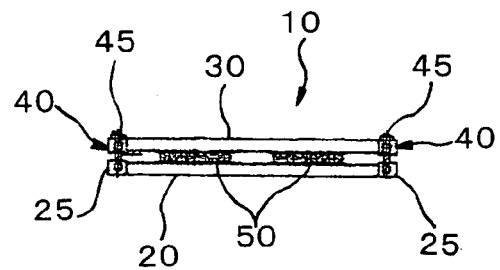
FIG. 3 is a rear view illustrating a vibration isolator pertaining to one embodiment of the present invention.
Figure 4:
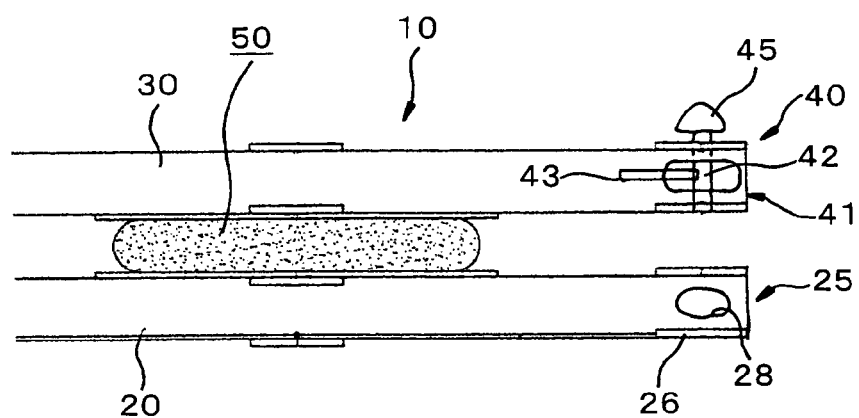
FIG. 4 is a side view of the critical part of a vibration isolator pertaining to one embodiment of the present invention.

Hereinbelow, one exemplary embodiment of the present invention will be described with reference to the attached drawings. The respective figures show the one embodiment of the present invention. As shown in FIG. 1 to FIG. 3, a vibration isolator 10 provides vibration isolation for cargo protection, being interposed beneath a transport container C, a merchandise transport pallet, or the like, which is transported, being loaded on a load carrying vehicle, such as a trailer T, a vessel, a freight train, a cargo truck, or the like, and in the vibration isolator 10, shock absorbing members 50, 50, . . . are interposed between a base frame 20 and a load carrying frame 30.

The load carrying frame 30 is made up of steel members connected in the form of a lattice, and at the four corners thereof, a twist lock 40 is disposed. The base frame 20 is also made up of steel members connected in the form of a lattice, and at the four corners thereof, a latch receiving structure 25 for receiving a twist lock 40 having the same structure as that of the above-mentioned twist lock 40 provided for a load carrying vehicle is disposed.

As can be seen from FIG. 4, and FIG. 6 to FIG. 8, the latch receiving structure 25 is a member into which a latch 45 of a twist lock 40 provided for a trailer T, or the like, is fitted for firmly securing the transport container C, or the like; and with which an insertion hole 27 for the latch 45 is provided in a base plate 26, and turning the latch 45 having been inserted into the insertion hole 27 will cause the latch 45 to be pressure-contacted with the top face of the base plate 26 for prevention of disconnection. In the side wall of the latch receiving structure 25, hooking holes 28, 29 are provided.

In addition, in the twist lock 40, a rotating shaft 42 is supported by a base body 41; an operation arm 43 is fixed to the rotating shaft 42; and a latch 45 is fixed to the tip of the rotating shaft 42.

Figure 5:
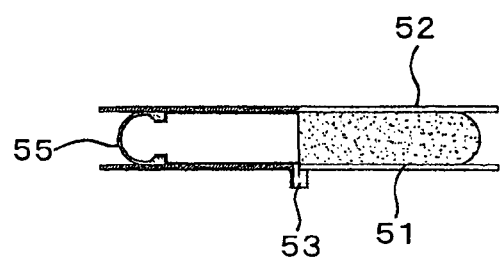
FIG. 5 is an explanatory drawing for a pneumatic spring, which is a shock absorbing member, to be used with a vibration isolator pertaining to one embodiment of the present invention.
Figure 6:
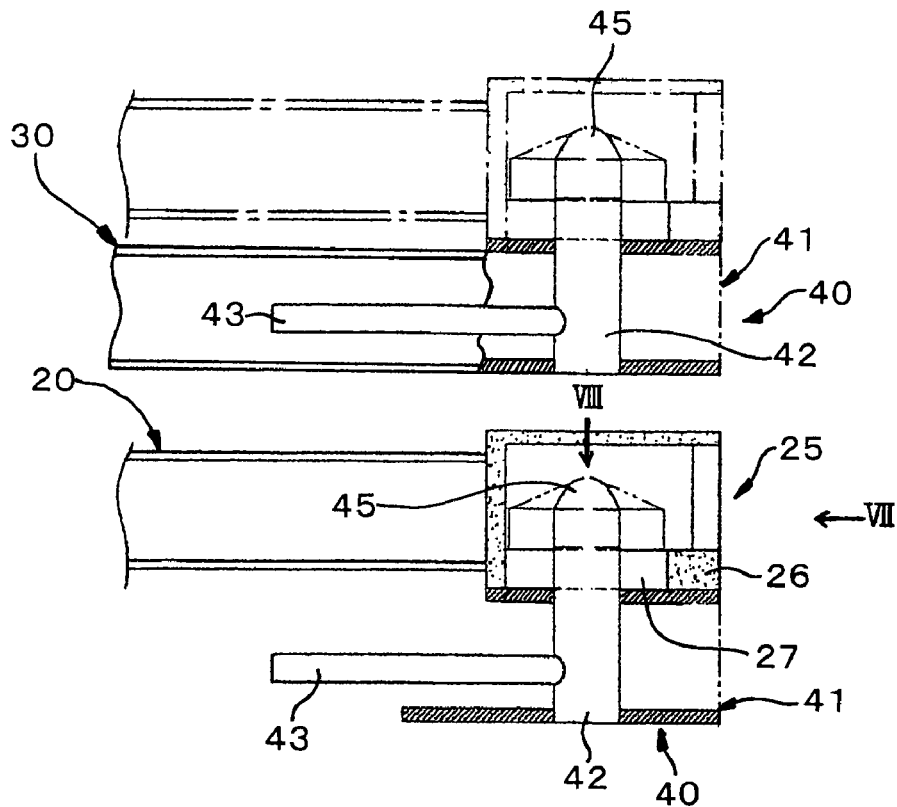
FIG. 6 is an explanatory drawing, partially in cross-section, for a latch receiving structure and a twist lock of a vibration isolator pertaining to one embodiment of the present invention.
Figure 7:
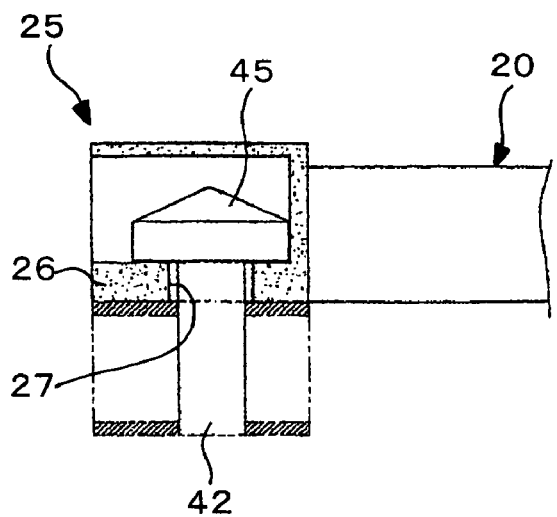
FIG. 7 is a view in the direction of arrow VII in FIG. 6.
Figure 8:
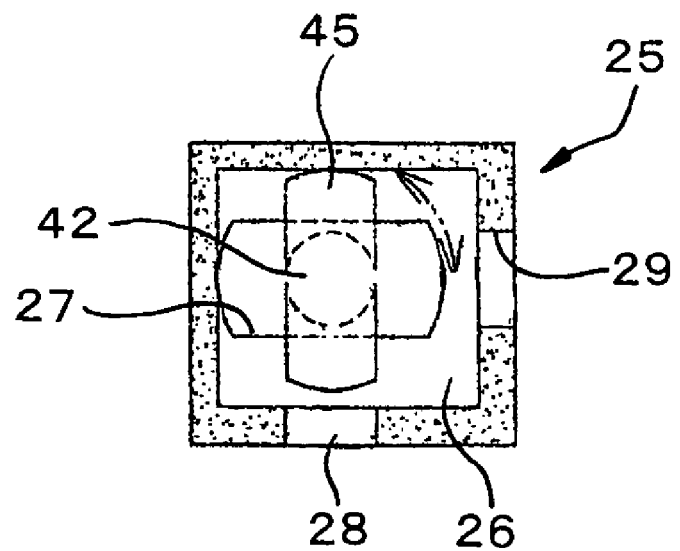
FIG. 8 is a view in the direction of arrow VIII in FIG. 6.

The shock absorbing members 50, 50, . . . are a plurality of pneumatic springs, and as shown in FIG. 5, are each formed of an elastic hermetically-sealed element 55 which is sandwiched between platform plates 51, 52. The elastic hermetically-sealed element 55 is made of an elastic rubber, or the like. The lower platform plate 51 is provided with a positioning projection 53.

Between the base frame 20 and the load carrying frame 30 of the vibration isolator 10, air reservoirs 60, 60 are provided, being supported by either of them. From the air reservoirs 60, 60, an air receiving pipe 61 extends forward, and at the tip thereof, an air chuck 65 is provided which is connected with a compressed air pipe from a load carrying vehicle, such as a trailer T. In addition, from the air reservoirs 60, 60, an air delivery pipe 62 is connected to the respective shock absorbing members 50, 50, . . . , which are pneumatic springs. Thereby, the air reservoir 60 accumulates the compressed air introduced through the air chuck 65 for feeding it to the shock absorbing members 50, 50, . . . , which are pneumatic springs, to allow the air pressure to be maintained properly.

Next, the function will be described. The vibration isolator 10 provides vibration isolation for cargo protection, being interposed beneath a transport container C, a merchandise transport pallet, or the like, which is transported, being loaded on a load carrying vehicle, such as a trailer T, a vessel, a freight train, a cargo truck, or the like.

Generally, the vibration isolator 10 is first mounted on a load carrying vehicle with the base frame 20 being placed downward. The load carrying vehicle is equipped with twist locks 40 having a latch 45, and the vibration isolator 10 is mounted such that the latches 45 of the twist locks 40 of the load carrying vehicle are fitted into the insertion holes 27 in the latch receiving structures 25 of the base frame 20, respectively. With the latches 45 being inserted into the insertion holes 27 respectively, operating the operation arms 43 for turning the rotating shafts 42 and the latches 45, respectively will cause the latches 45 to be pressure-contacted with the base plates 26 of the latch receiving structures 25, resulting in the latches 45 of the twist locks 40 being fixed such that they will not come off from the latch receiving structures 25, whereby the vibration isolator 10 is fixed.

The container C, or the like, is placed on the load carrying frame 30 of the vibration isolator 10 before being packed. The container C, or the like, is equipped with latch receiving structures 25, and the container C, or the like, is loaded such that the latches 45 of the twist locks 40 of the load carrying frame 30 are fitted into the insertion holes 27 of the latch receiving structures 25 of the container C, or the like. By operating the operation arms 43 for turning the rotating shafts 42 to turn the latches 45 of the twist locks 40 in the load carrying frame 30 of the vibration isolator 10, the latches 45 can be prevented from being disconnected from the latch receiving structures 25, resulting in the container C, or the like, being firmly secured.

When the load carrying vehicle loaded with the container C, or the like, is vibrated, the base frame 20 of the vibration isolator 10 is vibrated together. On the other hand, the load carrying frame 30 of the vibration isolator 10 is vibrated with the vibration being damped, because shock absorbing members 50 are interposed between the base frame 20 and the load carrying frame 30 for absorbing the vibration. The base frame 20 and the load carrying frame 30 of the vibration isolator 10 are displaced with respect to each other, however, the elastic hermetically-sealed elements 55 are elastically deformed to follow the vibrating motion. Thereby, no strong vibration will be transmitted directly to the articles loaded in the container C, or the like, thus the vibration isolator 10 equipped with the shock absorbing members 50 can provide protection.

The shock absorbing members 50 provide a plurality of pneumatic springs, the air therein serving as a cushion to sufficiently buffer the vibration. In addition, by adjusting the pneumatic pressure within the pneumatic springs, an appropriate shock absorbing action suited for the loaded articles is provided, which allows the function of the vibration isolator 10 to be sufficiently exerted.

With some trailers T, and the like, as load carrying vehicles, the compressed air created by means of the engine is utilized for controlling the brake. Likewise, with the vibration isolator 10, the compressed air pipe is connected to the air chuck 65 to supply compressed air to the pneumatic springs as the shock absorbing members 50. The compressed air introduced through the air chuck 65 is accumulated in the air reservoirs 60 through the air receiving pipes 61, and from the air reservoirs 60, the compressed air is supplied to the respective pneumatic springs through the air delivery pipes 62. Thereby, the air pressure in the pneumatic springs, which are the shock absorbing members 50, can be maintained at an appropriate value or properly adjusted.

Depending upon the specifications, the latch receiving structure 25 of the twist lock 40 may be disposed at the four corners of the load carrying frame 30, and also in the corresponding places in the base frame 20, the latch receiving structure 25 of the twist lock 40 may be disposed. In such a case, twist locks 40 are provided for the load carrying vehicle and the container C, or the like, and the latches 45 thereof are received by the latch receiving structures 25 for firmly securing the container C, or the like.

Contrarily to this, depending upon the specifications, the twist lock 40 may be disposed both in the base frame 20 and the load carrying frame 30, and in such a case, the latch receiving structures 25 are provided for the load carrying vehicle and the container C, or the like, the latches 45 being fitted thereinto for firmly securing the container C, or the like.

As the shock absorbing member 50, a shock absorber, or other hydraulic apparatuses can be used to buffer the vibration.

The vibration isolator 10 can be kept mounted to the bottom face of the container C, or the like, for carrying out loading/unloading, or transport. In case that the container C, or the like, is moved, being firmly secured to the load carrying vehicle, the shock absorbing members 50, which are pneumatic springs, buffer the vibration during movement in the same way as described above.

In addition, in case that the container C, or the like, is to be reloaded by lifting it or bringing it up, and then lowering it with the vibration isolator 10 being kept mounted, the base frame 20 of the vibration isolator 10 is first contacted with the ground or floor, the shock absorbing members 50 absorbing the impact. When carrying out reloading, the hook of a rope is engaged with the hooking holes 28, 29 in the latch receiving structure 25 for operation.

Because the vibration isolator 10 can be handled integrally with the container C, or the like, being kept mounted thereon, the loaded articles, and the like, can be protected, while smooth loading/unloading being carried out.

In addition, also with the vibration isolator 10 being kept mounted on the load carrying vehicle, loading/unloading, and transport can be carried out. When the container C, or the like, is loaded on the vibration isolator 10, the loaded articles, and the like, can be protected, the vibration during movement being buffered in the same way as described above. And, when the container C, or the like, is loaded on the vibration isolator 10 which is mounted on the load carrying vehicle, the shock absorbing members 50 absorb the impact which is applied when the bottom face of the container C, or the like, is butted against the load carrying frame 30 of the vibration isolator 10, thus protecting the loaded articles, and the like.

If the vibration isolator 10 is mounted on the load carrying vehicle, there is no need for taking any measure for vibration isolation on the side of the container C, or the like, and the articles, and the like, loaded in the container C, or the like, can be protected, while loading/unloading being smoothly carried out.

Figure 9:
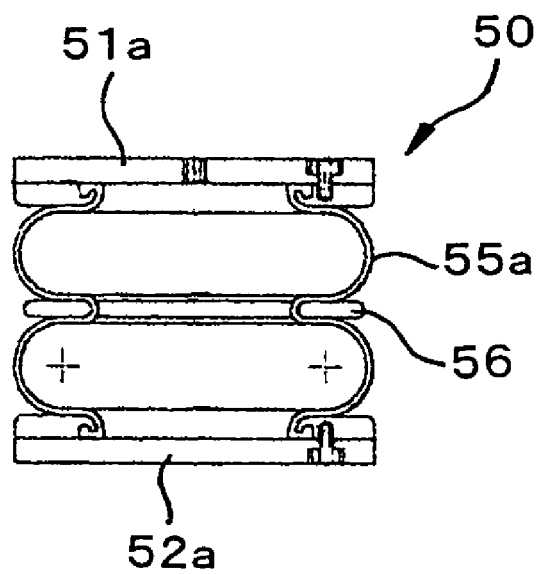
FIG. 9 is an explanatory drawing for another example of pneumatic spring, which is a shock absorbing member.

FIG. 9 shows another example of structure of the pneumatic spring, which is the shock absorbing member 50. Between platform plates 51a, 52a, an elastic hermetically-sealed element 55a is sandwiched. In the middle portion of the elastic hermetically-sealed element 55a, a suppression ring 56 for suppressing the inflation is fitted.

INDUSTRIAL APPLICABILITY

According to the vibration isolator for container, and the like, and the method of using the same pertaining to the present invention, the vibration isolator is configured as a vibration isolator which is independent of the container, or the like, and the load carrying vehicle, and is provided with a simple configuration in which shock absorbing members are interposed between the base frame and the load carrying frame, thus it is applicable to containers which are generally used, and the loaded articles can be protected against vibration at the time of transportation, and the like, with the cost being held to a minimum.

In case that a pneumatic spring is used as the shock absorbing member, the pneumatic pressure can positively buffer the vibration for protecting the articles. By properly setting the pneumatic pressure, the vibration can be buffered in the manner suited for the weight of the load and the type of the articles.

In an application where an air chuck is used for supplying compressed air to the pneumatic springs, the pneumatic pressure can always be monitored, and adjusted to a proper value, thus the vibration can be more positively buffered for protection of the articles.

In case that the container, or the like, is to be reloaded by lifting it or bringing it up and then lowering it with the vibration isolator being kept mounted, the base frame of the vibration isolator is first contacted with the ground or floor, the shock absorbing member absorbing the impact, and the vibration isolator can be handled integrally with the container, or the like, being kept mounted thereon, thus the loaded articles, and the like, can be protected, while smooth loading/unloading being carried out.

In addition, when the container, or the like, is loaded on the vibration isolator which is mounted on the load carrying vehicle, the shock absorbing member absorbs impact which is applied when the bottom face of the container, or the like, is butted against the load carrying frame of the vibration isolator, thus protecting the loaded articles, and the like, and if the vibration isolator is mounted on the load carrying vehicle, there is no need for taking any measure for vibration isolation on the side of the container, or the like, and the articles, and the like, loaded in the container, or the like, can be protected, while loading/unloading being smoothly carried out.

What is claimed is:

1. A vibration isolator for container and merchandise transport pallet that provides vibration isolation for cargo protection, being interposed beneath a transport container or a merchandise transport pallet wherein shock absorbing members based on a plurality of pneumatic springs are interposed between a base frame which is loaded on a load carrying vehicle and a load carrying frame on which the container or the merchandise transport pallet is loaded;

said load carrying frame is made up of steel members connected in a form of a lattice, and at least at four corners of the lattice, a twist lock is disposed which, by turning a latch fitted into a latch receiving structure provided for the container or the merchandise transport pallet, is engaged such that the twist lock will not come off;

said base frame is made up of steel members connected in a form of a lattice, and in a corresponding place therein, a latch receiving structure with which a latch of a twist lock of the load carrying vehicle is engaged is disposed; and said load carrying frame and base frame are combined to provide an assembly which is capable of being mounted to either a bottom face of the container or the merchandise transport pallet, or a top face of the load carrying vehicle.

2. A vibration isolator for container and merchandise transport pallet that provides vibration isolation for cargo protection, being interposed beneath a transport container or a merchandise transport pallet wherein shock absorbing members based on a plurality of pneumatic springs are interposed between a base frame which is loaded on a load carrying vehicle and a load carrying frame on which the container or the merchandise transport pallet is loaded;

said load carrying frame is made up of steel members connected in a form of a lattice, and at least at four corners of the lattice, a twist lock is disposed which, by turning a latch fitted into a latch receiving structure provided for the container or the merchandise transport pallet, is engaged such that the twist lock will not come off;

said base frame is made up of steel members connected in a form of a lattice, and in a corresponding place therein, a latch receiving structure with which a latch of a twist lock of the load carrying vehicle is engaged is disposed;

an air chuck which connects to a compressed air pipe from the load carrying vehicle, and an air reservoir which accumulates compressed air introduced through the air chuck for supplying it to the pneumatic springs are provided; and said load carrying frame and base frame are combined to provide an assembly which is capable of being mounted to either a bottom face of the container or the merchandise transport pallet, or a top face of the load carrying vehicle.

3. A vibration isolator for container and merchandise transport pallet that provides vibration isolation for cargo protection, being interposed beneath a transport container or a merchandise transport pallet wherein shock absorbing members based on a plurality of pneumatic springs are interposed between a base frame which is loaded on a load carrying vehicle and a load carrying frame on which the container or the merchandise transport pallet is loaded;

said load carrying frame is made up of steel members connected in a form of a lattice, and at least at four corners of the lattice, a twist lock is disposed which, by turning a latch fitted into a latch receiving structure provided for the container or the merchandise transport pallet, is engaged such that the twist lock will not come off; and said base frame is made up of steel members connected in a form of a lattice, and also in a corresponding place therein, a twist lock is disposed.

4. The vibration isolator of claim 1, wherein each shock absorbing member includes a shock absorber or a hydraulic apparatus.

5. A method of using a vibration isolator, wherein loading/unloading or transport is carried out with the vibration isolator of claim 1 being kept mounted to the bottom face of the container or the merchandise transport pallet.

6. A method of using a vibration isolator, wherein loading/unloading or transport is carried out with the vibration isolator of claim 1 being kept mounted to the load carrying vehicle.

7. The vibration isolator of claim 2, wherein each shock absorbing member includes a shock absorber or a hydraulic apparatus.

8. The vibration isolator of claim 3, wherein each shock absorbing member includes a shock absorber or a hydraulic apparatus.

* * * * *